(12) United States Patent
Kliese et al.

(10) Patent No.: US 10,931,078 B2
(45) Date of Patent: Feb. 23, 2021

(54) METHOD AND DEVICE FOR GENERATING PULSED LASER RADIATION

(71) Applicant: TOPTICA Photonics AG, Grafing (DE)

(72) Inventors: Russell Keith Kliese, Eichenau (DE); Thomas A. Puppe, Munich (DE); Rafal Wilk, Munich (DE); Matthias Hohenleutner, Munich (DE); Ali Seer, Munich (DE)

(73) Assignee: TOPTICA Photonics AG, Grafing (DE)

( * ) Notice: Subject to any disclaimer, the term of this patent is extended or adjusted under 35 U.S.C. 154(b) by 161 days.

(21) Appl. No.: 16/230,012

(22) Filed: Dec. 21, 2018

(65) Prior Publication Data

US 2019/0199054 A1    Jun. 27, 2019

(30) Foreign Application Priority Data

Dec. 22, 2017  (DE) .......................... 102017131244.7

(51) Int. Cl.
| | |
|---|---|
| *H01S 3/13* | (2006.01) |
| *H01S 3/11* | (2006.01) |
| *H01S 3/106* | (2006.01) |

(52) U.S. Cl.
CPC .......... *H01S 3/1304* (2013.01); *H01S 3/1062* (2013.01); *H01S 3/1109* (2013.01);
(Continued)

(58) Field of Classification Search
CPC .... H01S 3/1304; H01S 3/1307; H01S 3/1109; H01S 3/1106; H01S 3/1305; H01S 3/1062
See application file for complete search history.

(56) References Cited

U.S. PATENT DOCUMENTS

| | | | | |
|---|---|---|---|---|
| 6,785,303 | B1* | 8/2004 | Holzwarth | ............ H01S 3/1112 |
| | | | | 372/100 |
| 2006/0239312 | A1* | 10/2006 | Kewitsch | .................. H01S 5/42 |
| | | | | 372/29.023 |
| 2013/0202303 | A1* | 8/2013 | Wilkinson | .......... H04L 27/2697 |
| | | | | 398/76 |

FOREIGN PATENT DOCUMENTS

| | | |
|---|---|---|
| DE | 19911103 A1 | 9/2000 |
| DE | 102010048675 A1 | 4/2012 |

(Continued)

OTHER PUBLICATIONS

Examination Report issued in the corresponding German Application No. 10 2017 131 244.7, dated Nov. 28, 2018 (1 page).

(Continued)

*Primary Examiner* — Yuanda Zhang
(74) *Attorney, Agent, or Firm* — Adams and Reese LLP

(57) ABSTRACT

A method for generating stabilized, pulsed laser radiation is disclosed, the method including at least the steps of generating pulsed laser radiation at a repetition frequency, wherein the spectrum of the pulsed laser radiation is a frequency comb having a number of equidistant spectral lines; deriving a first controlled variable from the pulsed laser radiation by means of phase comparison with a high-frequency reference signal; generating narrow-band continuous-wave laser radiation at a reference wavelength; setting the reference wavelength in accordance with a first manipulated variable derived from the first controlled variable; deriving a second controlled variable by means of superposition of the pulsed laser radiation and the continuous-wave laser radiation; and setting the repetition frequency in accordance with a second manipulated variable derived from the second controlled variable. A device for generating stabilized, pulsed laser radiation compatible with the method is also disclosed.

15 Claims, 1 Drawing Sheet

Figure 1:
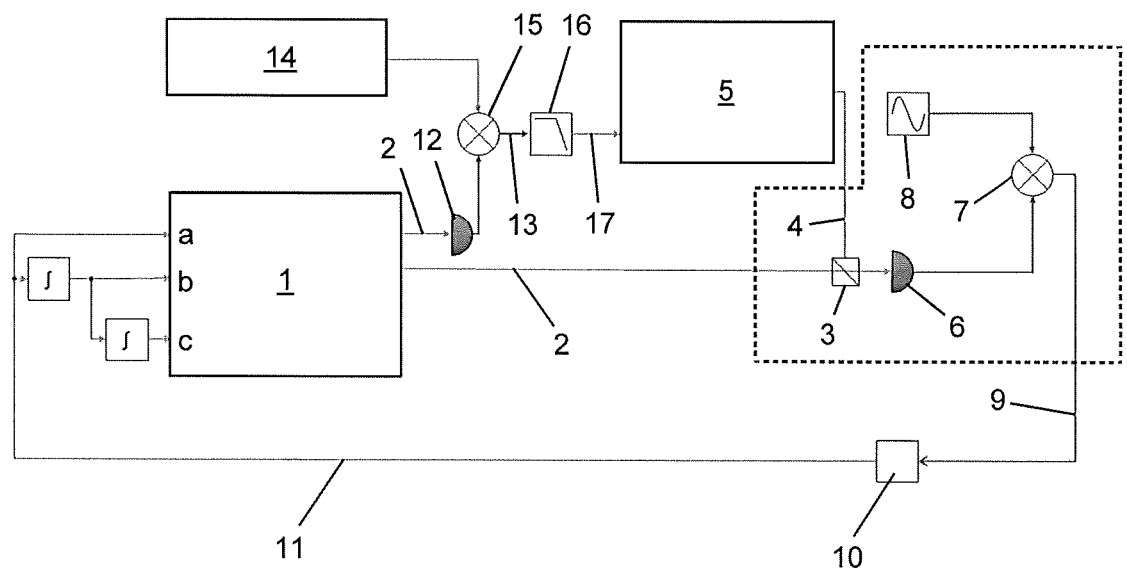

(52) U.S. Cl.
CPC ........... *H01S 3/1307* (2013.01); *H01S 3/1106* (2013.01); *H01S 3/1305* (2013.01)

(56) References Cited

FOREIGN PATENT DOCUMENTS

DE    102011122232 A1    6/2013
WO    2010/063051 A1    6/2010

OTHER PUBLICATIONS

Ian Coddington, William C. Swann, and Nathan R. Newbury, "Coherent Multheterodyne Spectroscopy Using Stabilized Optical Frequency Combs", Phys. Rev. Let. 100, 013902 (2008).

J. Millo, M. Abgrall, M. Lours, E. M. L. English, H. Jiang, J. Guena, A. Clairon, M. E. Tobar, S. Bize, Y. Le Coq, and G. Santarelli, "Ultralow noise microwave generation with fiber-based optical frequency comb and application to atomic fountain clock", Appl. Phys. Lett. 94, 141105 (2009).

S.M.F. Raupach, T. Legero, A. Bauch, C. Grebing, CH. Hagemann, T. Kessler, A. Koczwara, B. Lipphardt, H. Schnatz, U. Sterr, and G. Grosche, "A small-linewidth absolute optical frequency source", Proc. EFTF, 2012.

Proof of publication of "A small-linewidth absolute optical frequency source" on Jun. 13, 2013.

S.M.F. Raupach, T. Legero, C. Grebing, CH. Hagemann, T. Kessler, A. Koczwara, B. Lipphardt, M. Misera, H. Schnatz, G. Grosche, et al., "Subhertz-linewidth infrared frequency source with a long-term instability below $5\times10^{-15}$", Appl. Phys. B, 110, No. 4 (2013).

Jinkang Lim, Shu-Wei Huang, Abhinav K. Vinod, Parastou Mortazavian, Mingbin Yu, Dim-Lee Kwong, Anatoliy A. Savchenkov, Andrey B. Matsko, Lute Maleki, and Chee Wei Wong, "Stabilized chip-scale Kerr frequency comb via a high-Q reference photonic microresonator", Opt. Lett. 41, No. 16 (2016).

T.M. Fortier, M. S. Kirchner, F. Quinlan, J. Taylor, J. C. Bergquist, T. Rosenband, N. Lemke, A. Ludlow, Y. Jiang, C. W. Oates and S. A. Diddams, "Generation of ultrastable microwaves via optical frequency division", Nature Phontonics vol. 5 (2011).

NIST's public tender of Feb. 5, 2010.

Proof of publication of NIST's public tender on the website https://beta.SAM.gov.

Menlo Systems GmbH's bid for the NIST's public tender.

* cited by examiner

METHOD AND DEVICE FOR GENERATING PULSED LASER RADIATION

The invention relates to a method and a device for generating stabilized, pulsed laser radiation.

A sequence of short laser pulses can be generated using a mode-locked laser. In the process, a plurality of natural oscillations of different frequencies are stimulated in the resonator of the laser. Said natural oscillations are also referred to as modes. Each mode is a spectral component in the spectrum of the generated electromagnetic radiation. A fixed phase relation between the modes can be established by means of suitable mechanisms. This is also referred to as mode synchronization or mode locking. The mode locking results in the laser pulses being emitted at a temporal spacing which corresponds to a period of a laser pulse in the resonator of the laser. The temporally equidistant nature of the light pulses results directly in the spectrum of the electromagnetic radiation having equidistant spectral lines. A spectrum of this kind is also referred to as an optical frequency comb. The optical frequency comb is characterized by the repetition frequency, i.e. the inverse value of the period of the laser pulse in the resonator, and an offset frequency. The offset frequency is also referred to as the CEO (carrier-envelope offset) frequency. In this case, the frequencies of the individual spectral lines of the optical frequency comb are not integral multiples of the repetition rate. The frequency comb $f_i = f_{CEO} + i\Delta f$ applies for the frequency $f_i$ of the spectral line having the index i. In this case, $f_{CEO}$ is said carrier-envelope offset frequency. $\Delta f$ is the spacing between the spectral lines in the frequency comb, i.e. the repetition frequency. The carrier-envelope offset frequency is a result of the group velocity of the laser pulses differing from the phase velocity of the mutually superposed modes in the resonator of the laser. In this case, the magnitude of the carrier-envelope offset frequency depends on environmental influences, e.g. the temperature, but also on the pump power of the laser, etc. This means that the carrier-envelope offset frequency is not stable over time. The repetition frequency also fluctuates, inter alia owing to thermal and acoustic disturbances form the surroundings. Various technologies are known from the prior art for stabilizing a frequency comb of the type described above, e.g. for applications in the field of metrology. For example, DE 199 11 103 A1 describes a method and a device for generating light pulses, and the use thereof for synthesizing optical frequencies. In the known approach, each mode undergoes a spectrally specific frequency change by means of a pre-determined linear dispersion being introduced into the resonator of the mode-locked laser. On this basis, regulation is proposed for simultaneously adjusting the dispersion and the resonator length, by means of which the group and phase velocity can be regulated. The dispersion is adjusted for example by means of inserting a linearly dispersive element (e.g. glass wedge) into the beam path of the resonator. Alternatively, the resonator may comprise a pivotable end mirror. The change in the dispersion is necessarily associated with a change in the optical path length in the resonator, i.e. with a change in the resonator period (the repetition frequency), and thus with a change in the line spacing of the spectral lines of the frequency comb. This means that a second regulation, for example of the resonator length, is necessary. As a result, the known method or the known device comprise at least two interacting control circuits in order to stabilize both the carrier-envelope offset frequency and the repetition frequency. Locking to a frequency standard (e.g. atomic clock) is carried out in order to stabilize the frequency comb, the regulation of the carrier-envelope offset frequency taking place using an f-2f interferometer.

WO 2010/063051 A1 discloses a method and a device for generating a self-referenced optical frequency comb, in which an acousto-optic modulator is provided outside the laser resonator, which modulator allows for a frequency shift of all the spectral lines of the frequency comb. The frequency comb is stabilized on this basis.

Stabilized frequency combs of the type described above are well known for a plurality of applications. The line width of the individual spectral lines of a stabilized frequency comb of this kind which is locked to a conventional high-frequency reference, such as an oven-controlled crystal oscillator (OCXO), is typically approximately 100 kHz. A significantly narrower line width would be desirable however, for example in order to improve the resolution of frequency comb-based optical spectroscopy and/or to reduce the measuring time required for achieving a desired degree of precision. Furthermore, a smaller line width would mean that an optical frequency comb could be advantageously used as a universal, absolute reference for continuous-wave lasers in a wide range of experiments in the field of optical spectroscopy and quantum optics.

It is known from the prior art to lock an optical frequency comb to a continuous-wave laser having a narrow line width, as a result of which the short-term stability of the continuous-wave laser is transferred to all the spectral lines of the frequency comb. However, a disadvantage in this case is that the frequency comb follows the free-running continuous-wave laser and therefore does not have any (absolute) long-term stability, in contrast with a frequency comb which, as described above, is locked to a high-frequency reference having a high degree of long-term stability.

Against this background, the object of the invention is that of proposing as simple, robust and practical approach as possible for generating pulsed laser radiation, the spectrum of which radiation is an optical frequency comb, the line width of the individual spectral lines of the frequency comb being intended to be as small as possible and at the same time the frequency comb being intended to be stabilized over longer periods of time.

This object is achieved by the invention by means of a method for generating stabilized, pulsed laser radiation, comprising the following method steps:
  generating pulsed laser radiation at a repetition frequency, the spectrum of the pulsed laser radiation being a frequency comb having a number of equidistant spectral lines,
  deriving a first controlled variable from the pulsed laser radiation by means of phase comparison with a high-frequency reference signal,
  generating narrow-band continuous-wave laser radiation at a reference wavelength,
  setting the reference wavelength in accordance with a first manipulated variable derived from the first controlled variable,
  deriving a second controlled variable by means of superposition of the pulsed laser radiation and the continuous-wave laser radiation, and
  setting the repetition frequency in accordance with a second manipulated variable derived from the second controlled variable.

The object is furthermore achieved by a device for generating stabilized, pulsed laser radiation, comprising
  a mode-locked laser that generates pulsed laser radiation at a repetition frequency, the spectrum of the pulsed laser radiation being a frequency comb having a number of equidistant spectral lines, a first high-frequency oscillator that generates a high-frequency reference signal, a first phase or phase frequency detector that derives a first controlled variable from the pulsed laser radiation and the reference signal by means of phase comparison, a continuous-wave laser that generates narrow-band continuous-wave laser radiation at a reference wavelength, a first control element that derives a first manipulated variable from the first controlled variable and controls the continuous-wave laser for setting the reference wavelength in accordance with the first manipulated variable, a superposition element that superposes the continuous-wave laser radiation and the pulsed laser radiation and derives a second controlled variable from the superposition signal, and a second control element that derives a second manipulated variable from the second controlled variable and controls the mode-locked laser for setting the repetition frequency in accordance with the second manipulated variable.

According to the invention, the frequency comb that is generated by the mode-locked laser is locked to the continuous-wave laser as an optical reference. Regulation is carried out for this purpose, in which a beat signal is generated by means of superposing the pulsed laser radiation of the mode-locked laser and the continuous-wave laser radiation. This controlled variable is converted, by means of a suitable controller, into a manipulated variable which is used for setting the repetition frequency of the frequency comb. In this case, indirect locking to the high-frequency reference signal takes place by means of the reference wavelength of the continuous-wave laser radiation being regulated at the same time, specifically in accordance with a phase comparison of the repetition frequency with the reference signal that can be generated in a manner that is conventional and known per se, using a suitable long-term stable high-frequency oscillator.

This results in an optical frequency comb that is locked to a narrow-band continuous-wave laser. An optical frequency comb having narrow spectral lines is thus obtained by making use of the short-term stability of the continuous-wave laser. The line width of the spectral lines is substantially limited by the line width of the continuous-wave laser. Line widths of less than 100 Hz can be achieved according to the invention. The long-term stability is achieved at the same time, by means of the locking to the high-frequency reference.

In order to achieve a long-term stability that is sufficient for a plurality of applications, an oven-controlled crystal oscillator (OCXO) can be used as the high-frequency oscillator, as a reference.

The high-frequency reference signal is preferably stabilized by means of locking to a frequency standard. An atomic clock, for example, is suitable as a frequency standard. It is also conceivable to use a GPS disciplined high-frequency oscillator of a type known per se.

In a particularly preferred embodiment, the carrier-envelope offset frequency of the pulsed laser radiation is zero. It is known from the prior art to generate an optical frequency comb by means of difference frequency generation and (optionally) frequency multiplication, the carrier-envelope offset frequency of which frequency comb is zero (cf. DE 10 2010 048 576 A1). The only free parameter of a frequency comb of this kind that is relevant for the stabilization is the repetition frequency. In combination with a carrier-envelope offset frequency-free frequency comb, only two phase-locked loops are required for the practical implementation of the approach according to the invention; one (fast) phase-locked loop for locking the frequency comb to the continuous-wave laser radiation, and one (slower) phase-locked loop for locking to the high-frequency reference.

The method according to the invention can, however, also be used in combination with optical frequency combs of which the carrier-envelope offset frequency is not zero. In this case, a further phase-locked loop is required for regulating the carrier-envelope offset frequency. For this purpose, it is possible, as is conventional in the prior art, to derive a further controlled variable from the pulsed laser radiation by means of f-2f interferometry. Said manipulated variable is converted, by means of a suitable controller, into a manipulated variable for setting the carrier-envelope offset frequency, as in the prior art described at the outset.

In a preferred embodiment, a high-frequency oscillator, the frequency of which can additionally be adjusted, can be used for locking the frequency comb to the continuous-wave laser, a phase comparison of the superposition signal from the continuous-wave laser radiation and the pulsed laser radiation with the signal of the adjustable high-frequency oscillator being carried out. Adjusting the frequency of the high-frequency oscillator allows for a frequency spacing between the reference wavelength of the continuous-wave laser and the spectral line of the optical frequency comb used for locking in each case can be adjusted flexibly. The additional high-frequency oscillator is also intended to be stabilized, e.g. by means of locking to a frequency standard.

In a more preferred embodiment, the regulating bandwidth of the first control element is in a frequency range below a cut-off frequency, and the regulating bandwidth of the second control element is in a frequency range above the cut-off frequency, the phase noise of the first high-frequency oscillator below the cut-off frequency being less than the phase noise of the continuous-wave laser, and the phase noise of the continuous-wave laser above the cut-off frequency being less than the phase noise of the first high-frequency oscillator. The corner frequencies of the two control systems result, logically, from the intersection points of the phase noise spectra of the high-frequency oscillator and of the continuous-wave laser. In the case of short timescales, i.e. at correspondingly high frequencies (above the cut-off frequency, typically >100 kHz), the continuous-wave laser has a high degree of stability, i.e. the phase noise is low. Below the cut-off frequency, the phase stability of the high-frequency oscillator is better. Accordingly, in order to achieve an optimal line width of the spectral lines of the frequency comb, the first control element should perform the regulation in the frequency range in which the phase noise of the high-frequency reference is lower, and the further control element should be used in the frequency range in which the continuous-wave laser has a low phase noise. The frequency ranges of the two control systems should, as far as possible, not intersect.

Figure 2:
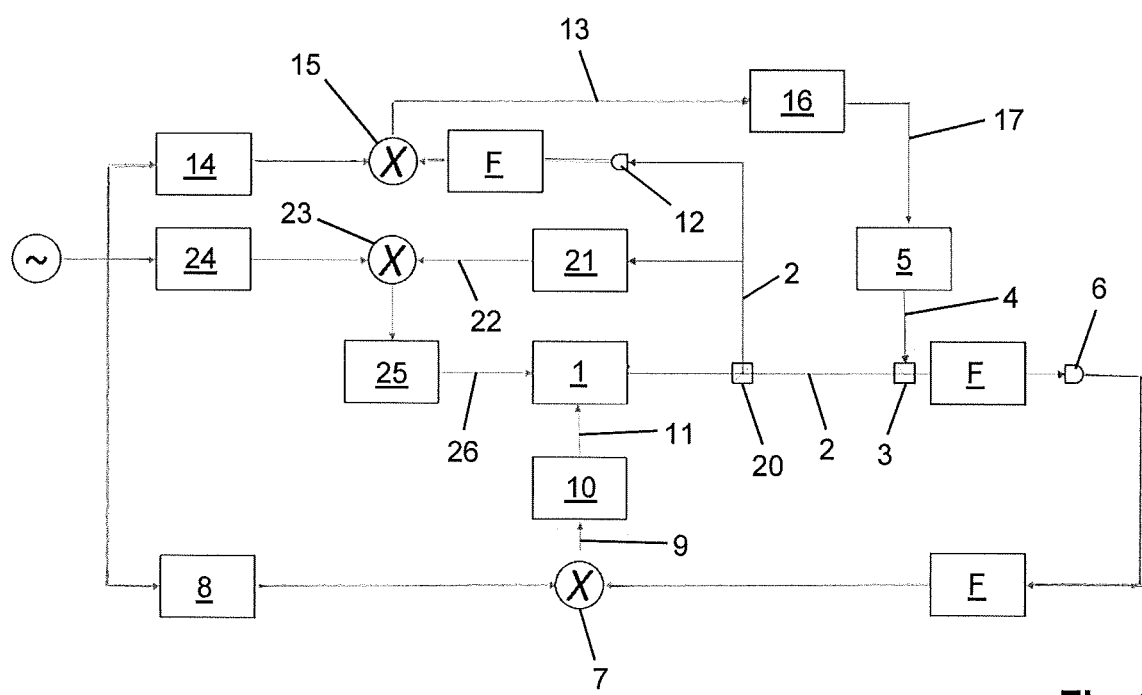

Embodiments of the invention will be explained in greater detail in the following, with reference to the drawings. In the drawings:

FIG. 1: is a block diagram of a first embodiment of a device according to the invention;

FIG. 2: is a block diagram of a second embodiment of a device according to the invention.

The device shown in FIG. 1 comprises a pulsed laser 1 that generates a sequence of temporally equidistant light pulses. The spectrum of the pulsed laser 1 is an optical frequency comb that is characterized by a repetition frequency in the manner described above. The pulsed laser 1 comprises a mode-locked laser, for example an erbium fiber laser. The laser 1 comprises three inputs a, b and c, via which different operating parameters of the laser 1 can be adjusted, for example the pump current, the resonator length (e.g. per piezo actuator), and the temperature. A larger or smaller number of inputs and a correspondingly larger or smaller number of adjustable parameters of the pulsed laser 1 is also conceivable. A beam splitter 3 superposes the radiation 4 of a continuous-wave laser 5 on the pulsed laser radiation 2, on a photodiode 6. The continuous-wave laser 5 is for example a narrow-band fiber laser, the line width of which is less than 100 Hz. A phase comparison of the output signal of the photodiode 6 with the signal of an adjustable high-frequency oscillator 8 is carried out using a phase frequency detector 7. The resulting phase detection signal 9 is fed to the input of a PID controller 10 which generates a signal 11 on the output side. Other types of controllers (e.g. PI controller, fuzzy controller, etc.) are also conceivable. The signal 11 is guided to the inputs a, b, c of the laser 1 such that the repetition frequency of the laser 1 is set in accordance with the signal 11. The beam splitter 3, the photo detector 6, the phase frequency detector 7 and the adjustable high-frequency oscillator 8 together form a superposition element (indicated by a dashed border) within the meaning of the invention. At a second output of the laser 1, the pulsed laser radiation 2 is guided to a further photo detector 12 in order to derive a further controlled variable 13 by means of phase comparison with a high-frequency reference signal of a high-frequency oscillator 14. The phase comparison is again carried out using a phase frequency detector 15. A loop filter 16 generates a control input 17 for setting the reference wavelength, i.e. the wavelength of the continuous-wave laser 5. The reference wavelength can be set for example using a frequency shifter (AOM, EOM) (not shown), which is a component of the laser system 5. Other manners of setting the reference wavelength are also conceivable, e.g. by means of temperature control, pump current, et.

A fast phase-locked loop (regulating bandwidth 100 kHz to several MHz), formed by the superposition element 3, 6, 7, 8 and the controller 10, thus locks the repetition frequency of the mode-locked laser 1 to the optical reference formed by the continuous-wave laser 5, by means of an optical phase-locked loop (OPLL). In addition, the phase error signal 13 between the repetition frequency and the long-term stable high-frequency reference of the oscillator 14 is used for tracking the continuous-wave laser 5 with a lower regulating bandwidth (a few MHz to a few kHz), such that the frequency comb of the laser 1 is locked to the repetition frequency specified by the oscillator 14 by means of locking to the continuous-wave laser 5. As a result, the phase noise of the frequency comb is reduced, at high frequencies, to that of the optical reference of the continuous-wave laser 5 and at the same time acquires the long-term stability of the high-frequency reference 14, it being possible for absolute referencing to be achieved by means of locking the high-frequency oscillator 14 to an atomic clock (hydrogen maser clock or the like; not shown in FIG. 1).

In the embodiment of FIG. 1, the laser 1 generates the frequency comb by means of difference frequency mixing (cf. DE 10 2010 048 576 A1). The carrier-envelope offset frequency is thus zero and the frequency comb has just one free parameter, specifically the repetition frequency. As a result, just one narrow-band optical oscillator (continuous-wave laser 5) is sufficient for reducing the phase noise and accordingly achieving narrow-band characteristics in the spectral lines of the frequency comb that are adjacent to the reference wavelength of the continuous-wave laser 5 in each case. The optical locking to the repetition frequency by means of the optical phase-locked loop reduces the phase noise of all the spectral lines of the frequency comb to the phase noise of the continuous-wave laser 5 that is scaled with the carrier frequency of the frequency comb in each case. Narrow-band lasers having line widths of <100 Hz are commercially available, in particular also at the wavelengths of 1550 nm which are important for practical applications. It is thus possible to achieve spectral lines in the frequency comb that are several orders of magnitude smaller, in the entire wavelength range (e.g. 0.4-2.5 µm), than is the case in a conventional frequency comb, together with a maximum long-term stability. Line widths of ~100 Hz can be achieved, which line widths are more than sufficient for most applications, e.g. in quantum optics.

FIG. 2 shows a device according to the invention, in which the carrier-envelope offset frequency of the laser 1 is not zero. The elements that correspond to the embodiment in FIG. 1 are denoted by the same reference signs in FIG. 2. Compared with the embodiment of FIG. 1, the device of FIG. 2 comprises a beam splitter 20, in order to feed the laser radiation 2 not only to the photo detector 12 for the phase comparison, but instead also to a f-2f interferometer 21 which derives a controlled variable 22 from the pulsed laser radiation 2. The controlled variable 22 corresponds to the carrier-envelope offset frequency of the frequency comb. A phase comparison with the signal of a further high-frequency-oscillator 24 is again carried out using a phase frequency detector 23. The phase detection signal obtained thereby is converted, by means of a further loop filter 25, into a manipulated variable 26, in order to control the laser 1 and to track the carrier-envelope offset frequency of the frequency comb. The embodiment according to FIG. 2 thus comprises a total of three phase-locked loops, in order to stabilize the frequency comb and lock said frequency comb to the continuous-wave laser 5 as a short-term stable optical reference. FIG. 2 further shows that the high-frequency oscillators 8, 14 and 24 are locked to a frequency standard 27 (atomic clock or the like) for the purpose of absolute referencing. Various filters that are used for processing the optical or electrical signals, which filters are each designed differently, according to the function, are all denoted by F in FIG. 2.

The invention claimed is:
1. A method for generating stabilized, pulsed laser radiation, comprising the following method steps:
generating pulsed laser radiation at a repetition frequency, wherein the spectrum of the pulsed laser radiation is a frequency comb having a number of equidistant spectral lines,
deriving a first controlled variable from the pulsed laser radiation by means of phase comparison with a high-frequency reference signal,
generating narrow-band continuous-wave laser radiation at a reference wavelength,
setting the reference wavelength in accordance with a first manipulated variable derived from the first controlled variable,
deriving a second controlled variable by means of superposition of the pulsed laser radiation and the continuous-wave laser radiation, and
setting the repetition frequency in accordance with a second manipulated variable derived from the second controlled variable.

2. The method according to claim 1, wherein the high-frequency reference signal is stabilized by means of locking to a frequency standard.

3. The method according to claim 1, wherein a line width of the continuous-wave laser radiation is less than 10 kHz.

4. The method according to claim 1, wherein a carrier-envelope offset frequency of the pulsed laser radiation is zero.

5. The method according to claim 1, further comprising the following further method steps:
deriving a third controlled variable from the pulsed laser radiation by means of f-2f interferometry, and
setting a carrier-envelope offset frequency of the pulsed laser radiation in accordance with a third manipulated variable derived from the third controlled variable.

6. A device for generating stabilized, pulsed laser radiation, comprising:
a mode-locked laser that generates pulsed laser radiation at a repetition frequency, wherein the spectrum of the pulsed laser radiation is a frequency comb having a number of equidistant spectral lines,
a first high-frequency oscillator that generates a high-frequency reference signal,
a first phase or phase frequency detector that derives a first controlled variable from the pulsed laser radiation and the reference signal by means of phase comparison,
a continuous-wave laser that generates narrow-band continuous-wave laser radiation at a reference wavelength,
a first control element that derives a first manipulated variable from the first controlled variable and controls the continuous-wave laser for setting the reference wavelength in accordance with the first manipulated variable,
a superposition element that superposes the continuous-wave laser radiation and the pulsed laser radiation and derives a second controlled variable from the superposition signal, and
a second control element that derives a second manipulated variable from the second controlled variable and controls the mode-locked laser for setting the repetition frequency in accordance with the second manipulated variable.

7. The device according to claim 6, wherein the continuous-wave laser comprises a frequency shifter that is controlled by the first control element for setting the reference wavelength.

8. The device according to claim 6, wherein the first high-frequency oscillator is an oven-controlled crystal oscillator.

9. The device according to claim 6, wherein the first high-frequency oscillator is GPS disciplined or is stabilized in another manner by means of locking to a frequency standard.

10. The device according to claim 6, further comprising: an f-2f interferometer that derives a third controlled variable from the pulsed laser radiation, wherein a third control element is provided, which derives a third manipulated variable from the third controlled variable and controls the mode-locked laser for setting a carrier-envelope offset frequency.

11. The device according to claim 6, further comprising: a second high-frequency-oscillator, the frequency of which can be adjusted, wherein the superposition element comprises a second phase or phase frequency detector which derives the second controlled variable from the signal of the second high-frequency-oscillator and the superposition signal by means of phase comparison.

12. The device according to claim 11, wherein the second high-frequency oscillator is also GPS disciplined or stabilized in another manner by means of locking to a frequency standard.

13. The device according to claim 6, wherein a regulating bandwidth of the first control element is in a frequency range below a cut-off frequency, and a regulating bandwidth of the second control element is in a frequency range above the cut-off frequency, wherein a phase noise of the first high-frequency oscillator below the cut-off frequency is less than a phase noise of the continuous-wave laser, and the phase noise of the continuous-wave laser above the cut-off frequency is less than the phase noise of the first high-frequency oscillator.

14. The method according to claim 1, wherein a line width of the continuous-wave laser radiation is less than 1 kHz.

15. The method according to claim 1, wherein a line width of the continuous-wave laser radiation is less than 100 Hz.

* * * * *

UNITED STATES PATENT AND TRADEMARK OFFICE
CERTIFICATE OF CORRECTION

Page 1 of 1

PATENT NO. : 10,931,078 B2
APPLICATION NO. : 16/230012
DATED : February 23, 2021
INVENTOR(S) : Kliese et al.

It is certified that error appears in the above-identified patent and that said Letters Patent is hereby corrected as shown below:

On the Title Page

Item (71) under Applicant: "TOPTICA Photonics AG, Grafing (DE)" should read -- TOPTICA Photonics AG, Gräfeling (DE) --.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*